United States Patent Office 3,574,792
Patented Apr. 13, 1971

3,574,792
SYNTHETIC RUBBER COMPOSITION
Hideo Hayashi, Kawasaki-shi, Japan, assignor to Nippon Petrochemicals Company, Ltd., Tokyo, Japan
No Drawing. Filed Aug. 15, 1968, Ser. No. 752,737
Claims priority, application Japan, Aug. 18, 1967, 42/52,728
Int. Cl. C08d 9/08; C08f 29/12
U.S. Cl. 260—894                                6 Claims

ABSTRACT OF THE DISCLOSURE

A synthetic rubber composition having improved tackiness which comprises
(i) a synthetic rubber and an addition product of unsaturated acid or anhydride thereof and a hydrocarbon resin obtained by polymerizing a fraction boiling within the range of from 20° C. to 280° C. and containing unsaturated hydrocarbons, said fraction being a by-product obtained in the cracking of petroleum oil to produce olefins, or
(ii) a synthetic rubber and an esterified product of said addition product.

---

This invention relates to a synthetic rubber composition, more particularly to a novel synthetic rubber composition having improved tackiness characterized by, (a) containing a synthetic rubber and an addition product of a hydrocarbon resin obtained by polymerizing a fraction containing unsaturated hydrocarbons and boiling within the range of 20°–280° C., said fraction obtained as a by-product in the cracking of petroleum and like, and an unsaturated acid or anhydride thereof, or (b) containing a synthetic rubber and an esterified product of such addition product.

Synthetic rubbers such as styrene-butadiene rubber, isobutylene-isoprene rubber, isoprene-butadiene rubber, butadiene rubber, chloroprene rubber and acrylonitrile-butadiene rubber are poor in tackiness as compared with natural rubber so that tackifiers are employed for improving the roll processing properties thereof and for increasing the tackiness of the bonding surfaces in the production of laminated products.

Heretofore known tackifiers for such purpose include alkylphenol resins such as alkylphenol-acetylene condensates, alkylphenol-formaldehyde condensates, alkylphenol-sulfide resins, xylene resins, coumarone-indene resins, petroleum resins and like.

Among these tackifiers, alkylphenol resins and xylene resins have relatively good tackifying effect but have the disadvantage of very high price. Coumarone-indene resins are relatively low in price but their tackifying effect is much lower than that of alkylphenol and xylene resins. Petroleum resins are similar to coumarone-indene resins in that they are also very low in tackifying effect.

It is important that a tackifier must increase the tack strength of a synthetic rubber by its incorporation therein without lowering other physical properties of the resultant synthetic rubber composition. Also, when the rubber composition is to be vulcanized it is important that the vulcanization must not be unduly disturbed by the addition of the tackifier. Also, tackifiers which have poor weatherproofing properties and poor heat resistance may cause to lower the qualities of the resultant rubber compositions and are not desirable.

Novel rubber composition comprising of a synthetic rubber and a novel tackifier according to this invention has excellent tack strength and is free from above described disadvantages of synthetic rubber tackified with conventional tackifiers. Further, synthetic rubber composition of this invention can be prepared at low cost commercially. Compositions of this invention are also effective as adhesives for bonding wood and other naturally occurring materials as well as synthetic high polymers.

Starting material for the preparation of the tackifiers of this invention is a cracked oil fraction boiling within the range of 20°–280° C., or a combination in suitable proportions of subfractions of such fraction of a by-product hydrocarbon oil obtained in the cracking of petroleum and like, for example thermal or catalytic cracking such as steam cracking, vapor-phase thermal cracking, sand cracking, etc. for the production of ethylene, propylene, butenes, butadienes, etc., using light or heavy naphtha, kerosene or light distillate fraction, or residual or crude oil, etc.

Lower boiling subfraction of above cracked oil fraction for example a subfraction having a boiling range of 20°–140° C. contains as polymerizable components conjugated cyclic diolefins such as cyclopentadiene, methylcyclopentadiene, conjugated aliphatic diolefins such as isoprene, piperylene, and monoolefins such as 2-methyl-butene-1, n-pentene in large amounts, and higher boiling subfraction for example a subfraction having a boiling range of 140°–280° C. contains styrene, styrene derivatives such as 2-methylstyrene, indene and indene derivatives such as methylindene in large amounts.

Any subfractions of above cracked oil fraction boiling within the range of 20°–280° C., for example a subfraction having a boiling range of 20°–140° C., a subfraction having a boiling range of 140°–280° C. as well as a remixture of such subfractions may be used as the starting material for the preparation of tackifiers of this invention. However, a fraction having the unsaturated aromatic hydrocarbon content as defined below within the range of 15–80% and the conjugated diolefin content as defined below within the range of 20–85% is particularly preferable as the starting material.

Unsaturated aromatic hydrocarbon content, percent $$= \frac{\text{Styrene derivatives} + \text{indene derivatives, percent by wt. (1)}}{\text{Total polymerizable components, percent by wt. (2)}}$$

Conjugated diolefins, content, percent $$= \frac{\text{Conjugated diolefin, percent by wt. (3)}}{\text{Total polymerizable components, percent by wt. (2)}}$$

NOTES (1) Percent by weight of the sum of styrene and its derivatives and indene and its derivatives in the fraction.

(2) Percent by weight of the sum of conjugated diolefins, non-conjugated diolefins, monoolefins, styrene and its derivatives and indene and its derivatives in the fraction.

(3) Percent by weight of the sum of conjugated cyclic diolefins and conjugated aliphatic diolefins in the fraction.

Hydrocarbon resin used for the preparation of tackifiers of this invention is obtained by polymerizing above cracked oil fraction at a temperature of −30°–+80° C. for 20 minutes–15 hours, using 0.05–5% by weight of a Friedel-Crafts type catalyst such as aluminum chloride, boron trifluoride and like, then decomposing the catalyst with an acid or alkali, and removing unreacted oils and low polymers by evaporation or distillation.

Hydrocarbon resin thus obtained has a softening point of 20°–120° C. (measured by JIS K–2531–60), a bromine number of 10–100 (ASTM D–1158), a number-average molecular weight of 500–1500, and a very pale color of below color number 1 (Gardner color scale, ASTM D–1544–58T, measured with a solution of 2 g. of sample in 25 ml. of benzene).

Tackifying effect of this hydrocarbon resin for rubber is similar to conventional coumarone-indene resin and is very low as compared with that of alkylphenol type resins.

Tackifier used in this invention is characterized in that the above hydrocarbon resin is subjected to further reaction and a derivative thereof is synthesized as will be described below.

Thus, hydrocarbon resin obtained as described above is melted or dissolved in a solvent such as a hydrocarbon oil or like, and an unsaturated acid or anhydride thereof is added to the resin.

Suitable amount of unsaturated acid or unsaturated acid anhydride to add to the hydrocarbon resin is 1–30 parts for 100 parts of the resin. Preferably, the mixture of the hydrocarbon resin and the unsaturated acid or unsaturated acid anhydride is reacted at a temperature in the range of 120°–250° C. for 1–16 hours, using a catalyst such as a peroxide catalyst in an amount of 0.01–5% by weight or without catalyst.

Typical unsaturated acids and anhydrides which may be used according to this invention are maleic acid, citraconic acid, endomethylenetetrahydrophthalic acid, tetrahydrophthalic acid, and anhydrides or acid halides thereof. These unsaturated acids and anhydrides can be used each alone. A mixture of acid and anhydride or a mixture of two or more than two acids or a mixture of two or more than two anhydrides can also be used.

Hydrocarbon resin thus obtained by the addition of unsaturated acid or unsaturated acid anhydride exhibits excellent tackifying effect when it is mixed with synthetic rubber. However, the addition product may further be modified as described below.

The addition product of hydrocarbon resin thus obtained is melted or dissolved in a solvent such as a hydrocarbon oil, and a monohydric alcohol such as methyl alcohol, ethyl alcohol, or a polyhydric alcohol such as ethylene glycol, glycerin, pentaerythritol, or a mixture of such alcohols is added thereto, and all or a part of the acid of the addition product is esterified by reacting at a temperature of 150°–280° C. for 1–25 hours, using a catalyst such as zinc dust, boric acid or like, or without using catalyst.

This invention relates to a synthetic rubber composition having improved tackiness comprising of a synthetic rubber and an addition product of hydrocarbon resin and an unsaturated acid or an unsaturated acid anhydride or an ester esterified derivative thereof.

Rubber composition of this invention may further contain conventional tackifier.

For the preparation of the composition of this invention, a synthetic rubber and the addition product of this invention described above are compounded by mixing procedure. For the purpose of increasing tack strength of the bonding surfaces in the processing of synthetic rubber it is preferred to use 3–30 parts of the addition product for 100 parts of the synthetic rubber. Below 3 parts improvement in the tackiness is insufficient and above 30 parts physical properties of the vulcanized rubber which is obtained by vulcanizing the synthetic rubber composition of this invention may be lowered. But 30–150 parts of the addition product may be used when the synthetic rubber composition of this invention is used for bonding paper, wood, synthetic high polymer and like. Above 150 parts the tack strength of the synthetic rubber composition is lowered.

Synthetic rubber composition of this invention not only exhibits the surprising feature of extremely high tack strength but also has the advantages of having none unfavorable influences on the other desirable physical properties of the synthetic rubber, none retardation of the vulcanization rate, and none increase of the heat aging property, etc. The addition product of this invention is pale in color so that it can advantageously be used in white rubber compositions.

Main raw material for the preparation of addition product is produced in large quantities in petrochemical industry so that, the addition products of this invention have the further advantage that they can be prepared in controlled quality at low cost.

For the purpose of illustrating this invention examples are set forth below without intending to limit this invention thereto.

EXAMPLE 1

A fraction having the boiling range of 20°–220° C. taken from a cracked oil fraction obtained from the steam cracking of naphtha had total polymerizable component content 62%, unsaturated aromatic hydrocarbon content 27% and conjugated diolefin content 39%. The fraction was polymerized at 40° C. for 5 hours, using 0.5% by weight of boron trifluorideethyl ether complex catalyst. After inactivating the catalyst with an aqueous solution of caustic soda, the reaction mixture was washed with water and unreacted oils were removed by evaporation under vacuum. Hydrocarbon resin (A) having a softening point of 40° C., bromine number 85, number-average molecular weight 700 and color number I was obtained.

This hydrocarbon resin (A) was heated to 200° C., and maleic anhydride was added to the resin in amounts of 6 g. and 10 g. After reaction for 4 hours maleic anhydride modified resin (I) and (II) were obtained. The modified resins had a softening point of 62° C., 80° C., bromine number of 83, 80, and number-average molecular weight of 750, 800, respectively. Color number was 3 for both resins.

The modified resin (I), (II), hydrocarbon resin (A) obtained as described above, commercial alkylphenol-formaldehyde resin, and commercial coumaroneindene resin each was mixed with styrene-butadiene rubber in the proportion shown in Table I. Compounds were prepared following the recipe of Table I, and tackiness, Mooney scorch, vulcanization and other tests were conducted with the compounds.

TABLE I

| | Parts by weight |
|---|---|
| Styrene-butadiene rubber | 100 |
| Stearic acid | 2 |
| Zinc oxide No. 1 | 5 |
| Sulfur | 2 |
| Vulcanization accelerator: | |
|    IM | 1.5 |
|    TT | 0.2 |
| HAF black | 50 |
| Process oil (Surcolite process aid) | 4 |
| Trackifier | 3 |

In the compounding, first a master batch was prepared by roll-mixing all ingredients except the tackifier maintaining the surface temperature of the rolls at 50°±5° C., and then the tackifier was roll-mixed therein maintaining the surface temperature of the rolls at a temperature of 5° C. above the softening point of the respective tackifier. Rolls had a diameter of 400 mm. and a width of 450 mm. The front roll was run at 18 r.p.m. and the revolution ratio was 1.18.

Each of above sample compounds was then made into a sheet of about 8 mm. thickness by rolling at a surface temperature of the rolls of 55°–60° C. for 8 minutes. These specimens were left at 21° C. for about 8 hours and then the tack strength was determined by Pickup Tackmeter, using press conditions of 5 seconds under 500 g. loading. Results of the tests are shown in the following Table II.

TABLE II

| Tackifier | Maleic anhydride modified resin | | Hydrocarbon resin (A) | Commercial alkyl phenol resin | Commercial coumarone-indene resin |
|---|---|---|---|---|---|
| | None | I | II | | | |
| Tack strength, g | 248 | 576 | 570 | 262 | 559 | 208 |
| "Index" | 100 | 232 | 230 | 106 | 225 | 84 |

"Index" in the table is the ratio of the tack strength taking that of the rubber compound containing no tackifier as 100.

As will be seen from above table, compositions containing styrene-butadiene rubber and maleic anhydride modified resin I and II have much superior tackiness as compared with compositions containing coumarone-indene resin and unmodified hydrocarbon resin (A). Tackiness of the compositions containing maleic anhydride modified resin I and II is even higher as compared with the composition containing alkylphenol resin.

Mooney scorch test of these samples was conducted according to the method of JISK 6300-1965. L-form rotor was employed in the test. Test temperature was 125° C. and preheating time was 1 minute. Results obtained are shown in the following Table III.

TABLE III

| Tackifier | Maleic anhydride modified resin | | | Hydrocarbon resin (A) | Commercial alkylphenol resin | Commercial coumarone-indene resin |
|---|---|---|---|---|---|---|
| | None | I | II | | | |
| Mooney viscosity ML$_{1+4}$, 125° C | 63 | 55 | 55 | 52 | 55 | 55 |
| Minimum Mooney viscosity, V$_m$ | 58 | 58 | 54 | 50 | 54 | 53 |
| Mooney scorch time: | | | | | | |
| t$_5$ | 22'-21" | 22'-20" | 22'-40" | 20'-40" | 14'-47" | 20'-42" |
| t$_{35}$ | 28'-09" | 29'-29" | 29'-55" | 28'-20" | 21'-54" | 28'-31" |
| t$_{\Delta 30}$ | 51'-48" | 7'-09" | 7'-15" | 8'-10" | 7'-07" | 7'-49" |

As will be seen from above Table III, there is not substantial difference between the compositions containing styrene-butadiene rubber and maleic anhydride modified resin I and II and the composition containing no tackifier in the Mooney scorch time, indicating that there will be no great difference in vulcanization time between the two.

The samples were then vulcanized at 150° C. for 10, 20, 30 and 40 minutes according to the method of ASTM D-15-64T, and physical properties of the vulcanizates were tested according to the method of JIS K6301-1963. The following test conditions were employed:

Tensile test:
    Schopper tensile machine (capacity 50 kg.)
    Rate of stretching—500 mm./min.
    Form of specimen—Dumbbell No. 3
Hardness test: Spring type hardmeter
Tear strength:
    Schopper tensile machine
    Rate of stretching—500 mm./min.
    Form of specimen—A
Air heat-aging test: Gear type aging testing machine 100° C. x 96 hours (Tests were made only with 30 min. vulcanizates.)
Room temperature when these tests were made was 22° C.

Results obtained are shown in the following Table IV.

TABLE IV

| | Vulcanization time, minutes | Tackifier | |
|---|---|---|---|
| | | None | Maleic anhydride [1] |
| 300% modulus, kg./cm.² | 10 | 126 | 103 |
| | 20 | 199 | 152 |
| | 30 | 228 | 182 |
| | 40 | 244 | 192 |
| Tensile strength, kg./cm.² | 10 | 253 | 239 |
| | 20 | 275 | 258 |
| | 30 | 279 | 268 |
| | 40 | 273 | 258 |
| Elongation, percent | 10 | 560 | 680 |
| | 20 | 440 | 520 |
| | 30 | 380 | 460 |
| | 40 | 370 | 400 |
| Hardness, H$_s$ | 10 | 66 | 65 |
| | 20 | 71 | 67 |
| | 30 | 71 | 70 |
| | 40 | 73 | 71 |
| Tear strength, kg./cm.² | 30 | 50 | 58 |
| Air heat-aging test: | | | |
| Tensile strength, kg./cm.² | | 246 | 234 |
| Rate of change, percent | | −20.2 | −16.8 |
| Elongation, percent | | 200 | 220 |
| Rate of change, percent | | −48.0 | −52.2 |
| Hardness, H$_s$ | | 80 | 79 |
| Rate of change, percent | | +9 | +9 |

[1] Modified resin I.

As will be seen from above Table IV, there is no substantial difference between the composition containing styrene-butadiene rubber and maleic anhydride modified resin I and the composition containing no tackifier in the vulcanization time and in the physical properties of the vulcanizate. Also, no unfavorable influences are found in the results of air heat-aging test by the incorporation of the tackifier of this invention.

EXAMPLE 2

To 31 kg. of the modified resin (I) obtained in Example 1, 31 g. of ethylene glycol and 64 g. of methyl alcohol were added, and the resin was esterified at 250° C. for 12 hours in an autoclave. Modified resin (III) obtained had a softening point of 56° C., bromine number of 80, number-average molecular weight of 780 and color number of 5.

Isobutylene-isoprene rubber and this modified resin (III), commercial alkylphenol-formaldehyde resin and commercial coumarone-indene resin as tackifier, respectively, were roll-mixed following the recipe of Table V, and the tack strength and Mooney scorch tests were conducted with the compounds. Procedures used for the compounding and testing were identical as described in Example 1.

TABLE V

| | Parts by weight |
|---|---|
| Isobutylene-isoprene rubber (Polysar Butyl No. 301, trade name) | 100 |
| Zinc oxide No. 1 | 5 |
| Stearic acid | 1 |
| Sulfur | 2 |
| Vulcanization accelerator: | |
| DM | 0.5 |
| TT | 1.0 |
| FT black | 50 |
| HAF black | 30 |
| Process oil (Surcolite process aid) | 3 |
| Tackifier | 5 |

Results obtained are shown in the following Table VI.

TABLE VI

| Tackifier | None | Modified resin III | Commercial alkylphenol resin | Commercial coumarone-indene resin |
|---|---|---|---|---|
| Tackmeter test: | | | | |
| Tack strength grams | 240 | 290 | 250 | 240 |
| Index | 100 | 120 | 105 | 100 |
| Mooney scorch test: | | | | |
| $ML_{1+4}$, 125° C | 60 | 57 | 59 | 60 |
| $V_m$ | 58 | 56 | 58 | 58 |
| $t_5$ | 16'-15" | 17'-45" | 17'-10" | 19'-30" |
| $t_{35}$ | 22'-15" | 23'-03" | 23'-13" | 27'-17" |
| $t_{30}$ | 6'-00" | 5'-18" | 6'-03" | 7'-47" |

As will be seen from above Table VI, the composition containing isobutylene-isoprene rubber and modified resin III has a higher tack strength as compared with the compositions containing alkylphenol resin and coumarone-indene resin, and from the results of Mooney scorch test it is seen that the vulcanization rate is not retarded by the incorporation of modified resin III.

EXAMPLE 3

From a cracked oil obtained from naphtha steam cracking a fraction having a boiling range of 20°–120° C. and a fraction having a boiling range of 140°–180° C. were separated, and a mixture consisting of 70% by weight of the former and 30% by weight of the latter was made. The mixed fraction had total polymerizable content 55%, unsaturated aromatic hydrocarbon content 64% and conjugated diolefin content 22%. The mixed fraction was polymerized under similar conditions as described in Example 1, and a hydrocarbon resin having a softening point of 72° C., bromine number 95, number-average molecular weight 840 and color number 1 was obtained.

100 g. of this hydrocarbon resin was reacted with 5 g. of maleic anhydride under same conditions as described in Example 1, and maleic anhydride modified resin (IV) having a softening point of 81° C., bromine number 84, number-average molecular weight 880 and color 3 was obtained.

Styrene-butadiene rubber (white) and this modified resin (IV), commercial alkylphenol-formaldehyde resin and commercial coumarone-indene resin as tackifier, respectively, were roll-mixed following the recipe of Table VII, and the tack strength and Mooney scorch tests were conducted with the compounds. Procedures used for the compounding and testing were identical as described in Example 1.

TABLE VII

| | Parts by weight |
|---|---|
| Styrene-butadiene rubber | 100 |
| Stearic acid | 1.5 |
| Zinc oxide No. 1 | 5 |
| Sulfur | 2 |
| Vulcanization accelerator: | |
| DM | 1.5 |
| TT | 0.2 |
| Dixie clay | 35 |
| Nibseal VN-3 | 25 |
| Light calcium carbonate (Akadama) | 30 |
| Diethylene glycol | 2.5 |
| Process oil (Surcolite process aid) | 4 |
| Tackifier | 5 |

Results obtained are shown in the following Table VIII.

TABLE VIII

| Tackifier | None | Maleic anhydride modified resin | Commercial alkylphenol resin | Commercial coumarone-indene resin |
|---|---|---|---|---|
| Tackmeter test: | | | | |
| Tack strength, grams | 190 | 315 | 275 | 280 |
| Index | 100 | 165 | 145 | 150 |
| Mooney scorch test: | | | | |
| $ML_{1+4}$ 125° C | 54 | 48 | 48 | 48 |
| $V_m$ | 50 | 39 | 46 | 45 |
| $t_5$ | 20'-40" | 29'-55" | 17'-25" | 23'-35" |
| $t_{35}$ | 27'-21" | 38'-48" | 24'-28" | 30'-58" |
| $t_{A30}$ | 6'-41" | 3'-53" | 7'-08" | 7'-23" |

As will be seen from above Table VIII, the composition (white blend) containing styrene-butadiene rubber and maleic anhydride modified resin IV has a higher tack strength as compared with the compositions containing alkylphenol resin and coumarone-indene resin, and the vulcanization rate is not retarded substantially by the use of the maleic anhydride modified resin IV.

What is claimed is:
1. A synthetic rubber composition of improved tackiness which comprises:
 (I) 100 parts by weight of a synthetic rubber selected from the group consisting of styrene-butadiene rubber, isobutylene-isoprene rubber, isoprene-butadiene rubber, butadiene rubber, chloroprene rubber and acrylonitrile-butadiene rubber; and
 (II) from 3 to 150 parts by weight of an addition product obtained by reacting 100 parts by weight of a hydrocarbon resin with from 1 to 30 parts by weight of an unsaturated dicarboxylic acid or unsaturated dicarboxylic acid anhydride, wherein said hydrocarbon resin is obtained by polymerizing a fraction boiling in the range of from 20° C. to 280° C., said fraction being a byproduct obtained in the cracking of petroleum oil to produce olefins and containing unsatu- rated hydrocarbons, and having the unsaturated aromatic hydrocarbon content within the range of from 15 to 80% and the conjugated diolefin content in the range of from 20 to 85% as defined in the formulae below, at a temperature in the range of from −30° C. to +80° C.;

Unsaturated aromatic hydrocarbon content, percent $$= \frac{\text{Styrene derivatives + indene derivatives, percent by wt. (1)}}{\text{Total polymerizable components, percent by wt. (2)}}$$

Conjugated diolefin content, percent $$= \frac{\text{Conjugated diolefins, percent by wt. (3)}}{\text{Total polymerizable components, percent by wt. (2)}}$$

wherein
(1) denotes "percent by weight of the sum of styrene and its derivatives and indene and its derivatives in the fraction."
(2) denotes "percent by weight of the sum of conjugated diolefins, non-conjugated diolefins, monoolefins, styrene and its derivatives and indene and its derivatives in the fraction."
(3) denotes "percent by weight of the sum of conjugated cyclic diolefins and conjugated aliphatic diolefins in the fraction," and said hydrocarbon resin having a softening point of 20°–120° C., a bromine number 10–100, and e number-average molecular weight of 500–1,500.

2. A synthetic rubber composition according to claim 1, wherein said addition product is obtained by said hydrocarbon with said unsaturated dicarboxylic acid or unsaturated dicarboxylic acid anhydride which is a member selected from the group consisting of maleic acid, chloromaleic acid, citraconic acid, endomethylene-tetrahydrophthalic acid, tetrahydrophthalic acid and their anhydrides at a temperature in the range of from 120° C. to 250° C.

3. A synthetic rubber composition of improved tackiness which comprises:
(I) 100 parts by weight of a synthetic rubber selected from the group consisting of styrene-butadiene rubber, isobutylene-isoprene rubber, isoprene-butadiene rubber, butadiene rubber, chloroprene rubber and acrylonitrile-butadiene rubber; and
(II) from 3 to 150 parts by weight of an esterified product of an addition product obtained by reacting 100 parts by weight of a hydrocarbon resin with from 1 to 30 parts by weight of an unsaturated dicarboxylic acid or unsaturated dicarboxylic acid anhydride, wherein said hydrocarbon resin is obtained by polymerizing a fraction boiling in the range of from 20° C. to 280° C., said fraction being a by-product obtained in the cracking of petroleum oil to produce olefins and containing unsaturated hydrocarbons, and having the unsaturated aromatic hydrocarbon content within the range of from 15 to 80% and the conjugated diolefin content in the range of from 20 to 85% as defined in the formulae below, at a temperature in the range of from −30° C. to +80° C.:

Unsaturated aromatic hydrocarbon content, percent $$= \frac{\text{Styrene derivatives + indene derivatives, percent by wt. (1)}}{\text{Total polymerizable components, percent by wt. (2)}}$$

Conjugated diolefin content, percent $$= \frac{\text{Conjugated diolefins, percent by wt. (3)}}{\text{Total polymerizable components, percent by wt. (2)}}$$

wherein
(1) denotes "percent by weight of the sum of styrene and its derivatives and indene and its derivatives in the fraction."
(2) denotes "percent by weight of the sum of conjugated diolefins, non-conjugated diolefins, monoolefins, styrene and its derivatives and indene and its derivatives in the fraction."
(3) denotes "percent by weight of the sum of conjugated cyclic diolefins and conjugated aliphatic diolefins in the fraction," and said hydrocarbon resin having a softening point of 20°–120° C., a bromine number 10–100, and a number-average molecular weight of 500–1,500.

4. A synthetic rubber composition according to claim 3 wherein said addition product is obtained by said hydrocarbon with said unsaturated dicarboxylic acid or unsaturated dicarboxylic acid anhydride which is a member selected from the group consisting of maleic acid, chloromaleic acid, citraconic acid, endomethylene-tetrahydrophthalic acid, tetrahydrophthalic acid and the anhydride, at a temperature in the range of from 120° C. to 250° C.

5. A synthetic rubber composition according to claim 3, wherein said esterified product is obtained by esterifying said addition product with an alcohol selected from the group consisting of monohydric alcohols, polyhydric alcohols and their mixture at a temperature within the range of from 150° C. to 280° C.

6. A synthetic rubber composition according to claim 5, wherein said alcohol is one selected from the group consisting of methyl alcohol, ethyl alcohol, ethylene glycol, glycerine, pentaerythritol and their mixture.

References Cited

UNITED STATES PATENTS

| | | | |
|---|---|---|---|
| 2,513,183 | 6/1950 | Kurtz | 260—888 |
| 2,844,567 | 7/1958 | Dazzi | 260—94.7 |
| 3,379,663 | 4/1968 | Takel et al. | 260—82 |

SAMUEL H. BLECH, Primary Examiner

U.S. Cl. X.R.

161—250, 251; 260—23.7, 41.5, 78.4, 82, 876, 879